United States Patent
Luo et al.

(10) Patent No.: US 12,105,188 B2
(45) Date of Patent: Oct. 1, 2024

(54) RADAR POWER CONTROL METHOD AND APPARATUS

(71) Applicant: HUAWEI TECHNOLOGIES CO., LTD., Shenzhen (CN)

(72) Inventors: Pengfei Luo, Beijing (CN); Tong Jiang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 438 days.

(21) Appl. No.: 17/484,462

(22) Filed: Sep. 24, 2021

(65) Prior Publication Data

US 2022/0011425 A1 Jan. 13, 2022

Related U.S. Application Data

(63) Continuation of application No. PCT/CN2019/080157, filed on Mar. 28, 2019.

(51) Int. Cl.
*G01S 13/86* (2006.01)
*G01S 7/292* (2006.01)
(Continued)

(52) U.S. Cl.
CPC ............ *G01S 13/865* (2013.01); *G01S 7/292* (2013.01); *G01S 7/40* (2013.01); *G01S 7/487* (2013.01); *G01S 13/931* (2013.01); *G01S 17/931* (2020.01)

(58) Field of Classification Search
CPC ...... G01S 13/865; G01S 17/931; G01S 7/292; G01S 7/40; G01S 7/487; G01S 13/931
See application file for complete search history.

(56) References Cited

U.S. PATENT DOCUMENTS

| 10,816,939 | B1* | 10/2020 | Coleman ................ G01S 17/86 |
| 2013/0116670 | A1* | 5/2013 | Artsyukhovich .... A61B 3/1233 606/4 |

(Continued)

FOREIGN PATENT DOCUMENTS

| CN | 1349612 A | 5/2002 |
| CN | 102832634 A | 12/2012 |

(Continued)

OTHER PUBLICATIONS

European Search Report issued in corresponding European Application No. 19920818.2, dated Feb. 15, 2022, pp. 1-9, European Patent Office, Munich, Germany.

(Continued)

*Primary Examiner* — Vladimir Magloire
*Assistant Examiner* — Noah Yi Min Zhu
(74) *Attorney, Agent, or Firm* — HAUPTMAN HAM, LLP

(57) ABSTRACT

A radar power control method and an apparatus are provided. The method includes: emitting a first detection signal at a target emission angle; obtaining a reflectivity of a first detection point of the first detection signal if signal power of an echo signal of the first detection signal is less than a preset power threshold, where the first detection point is a point on a surface of a detected object in a direction of the target emission angle; and increasing emission power corresponding to the target emission angle if the reflectivity of the first detection point is greater than a preset first threshold. The solution helps consider both power consumption and a detection distance of a radar.

19 Claims, 11 Drawing Sheets

(51) Int. Cl.
*G01S 7/40* (2006.01)
*G01S 7/487* (2006.01)
*G01S 13/931* (2020.01)
*G01S 17/931* (2020.01)

(56) References Cited

U.S. PATENT DOCUMENTS

| | | | |
|---|---|---|---|
| 2017/0010355 A1* | 1/2017 | Christianson | G01S 7/415 |
| 2018/0059228 A1* | 3/2018 | Raina | G01S 17/04 |
| 2018/0081029 A1* | 3/2018 | Davis | G01S 13/931 |
| 2018/0100925 A1 | 4/2018 | Gilliland et al. | |
| 2018/0123313 A1* | 5/2018 | Chen | H01S 3/06791 |
| 2018/0205144 A1 | 7/2018 | Huang et al. | |
| 2018/0329050 A1* | 11/2018 | Amihood | G01S 7/4008 |
| 2019/0025426 A1 | 1/2019 | Satyan et al. | |
| 2019/0129031 A1* | 5/2019 | Qiu | G01S 7/4868 |

FOREIGN PATENT DOCUMENTS

| | | | | |
|---|---|---|---|---|
| CN | 204989458 U | * | 1/2016 | |
| CN | 106842223 A | * | 6/2017 | |
| CN | 106981819 A | | 7/2017 | |
| CN | 108303690 A | | 7/2018 | |
| CN | 108761406 A | * | 11/2018 | |
| CN | 109031253 A | | 12/2018 | |
| CN | 109196373 A | | 1/2019 | |
| EP | 1835304 A2 | | 9/2007 | |
| JP | H10239432 A | | 9/1998 | |
| JP | 2006258457 A | | 9/2006 | |
| JP | 2018528633 A | | 9/2018 | |
| JP | 2018169336 A | | 11/2018 | |
| KR | 101895727 B1 | | 9/2018 | |
| WO | 2017060965 A1 | | 4/2017 | |
| WO | 2017200896 A2 | | 11/2017 | |
| WO | WO-2018055449 A2 | * | 3/2018 | B60Q 1/0023 |
| WO | 2018208958 A1 | | 11/2018 | |

OTHER PUBLICATIONS

International Search Report issued in corresponding International Application No. PCT/CN2019/080157, dated Jan. 6, 2020, pp. 1-5.
Chinese Office Action issued in corresponding Chinese Application No. 201980055165.X, dated Jun. 23, 2021, pp. 1-7.
Japanese Office Action issued in corresponding Japanese Application No. 2021-557421, dated Aug. 29, 2022, pp. 1-3.

* cited by examiner

RADAR POWER CONTROL METHOD AND APPARATUS

CROSS-REFERENCE TO RELATED APPLICATIONS

This application is a continuation of International Application No. PCT/CN2019/080157, filed on Mar. 28, 2019, the disclosure of which is hereby incorporated by reference in its entirety.

TECHNICAL FIELD

This application relates to the field of radar detection technologies, and in particular, to a radar power control method and an apparatus.

BACKGROUND

A radar is often used to detect a near or distant object. A light detection and ranging (light detection and ranging, LiDAR) radar, namely, a lidar, is used as an example. During object detection, the lidar may emit a laser pulse to measure features of a detected object within a specific scanning angle range. For example, the lidar may emit a laser pulse at an emission angle A. If there is a detected object in a direction of the emission angle A, the laser pulse may reach the detected object and may be reflected on a surface of the detected object. After detecting a laser pulse reflected back (namely, an echo signal), the lidar may determine, based on the detected echo signal, a distance between a detection point of the laser pulse reflected on the surface of the detected object and the radar. The lidar switches to different emission angles, to obtain distances between a plurality of detection points on the surface of the detected object and the radar, and therefore obtain a plurality of features of the detected object, such as a three-dimensional shape, a position, and a form. Generally, the lidar sequentially emits detection signals at different emission angles in a preset scanning angle range, to obtain a scan image after completing one scanning in the scanning angle range, and therefore obtain features of one or more detected objects within the scanning angle range, such as three-dimensional shapes, positions, and forms.

However, because the echo signal is affected by factors, such as a reflectivity of the surface of the detected object, and the distance between the detected object and the lidar, the lidar probably cannot receive the echo signal. As a result, the radar cannot detect the detected object. Although increasing emission power of the laser pulse can prolong a detection distance of the lidar, it does not help reduce power consumption of the radar if the emission power of the lidar is directly increased when no echo signal is received.

Therefore, a technical solution considering both power consumption and the detection distance of the radar is urgently required in the conventional technology.

SUMMARY

Embodiments of this application provide a radar power control method and an apparatus, to provide a technical solution that helps consider both power consumption and a detection distance of a radar.

According to a first aspect, an embodiment of this application provides a radar power control method, including: emitting a first detection signal at a target emission angle based on emission power corresponding to the target emission angle, where the target emission angle is an emission angle included in a plurality of emission angles of a radar; obtaining a reflectivity of a first detection point of the first detection signal if signal power of an echo signal of the first detection signal is less than a preset power threshold, where the first detection point is a point on a surface of a detected object in a direction of the target emission angle; and increasing the emission power corresponding to the target emission angle if the reflectivity of the first detection point is greater than a preset first threshold.

In one scanning process, the radar emits a signal at emission power corresponding to each emission angle, so that the radar can control the emission power corresponding to different emission angles. Generally, the signal power of the echo signal is mainly affected by signal power of the first detection signal, the reflectivity of the first detection point, and a distance to the first detection point. If the signal power of the echo signal is excessively small due to the reflectivity of the first detection point, increasing the emission power corresponding to the target emission angle does not prolong a detection distance of the radar in the direction of the target emission angle. According to the foregoing method, the radar may determine whether to increase the emission power corresponding to the target emission angle based on the reflectivity of the first detection point. This helps eliminate interference of the reflectivity of the first detection point on power adjustment. When the radar determines to increase the emission power corresponding to the target emission angle, this helps prolong the detection distance of the radar in the direction of the target emission angle. When the radar determines to not increase the emission power corresponding to the target emission angle, this helps reduce unnecessary power consumption of the radar. Therefore, the solution helps consider both power consumption and the detection distance of the radar.

In a possible implementation, an echo-free region in a scan image may further be obtained, where the scan image is obtained based on echo signals of detection signals emitted at a plurality of emission angles, and the echo-free region is a region corresponding to a plurality of spatially continuous echo signals whose signal power is less than the power threshold and whose quantity is greater than a preset quantity. The reflectivity of the first detection point of the first detection signal is obtained after that an area of a target echo-free region including the first detection point is not greater than a second threshold is determined, and/or that a solid angle corresponding to the target echo-free region is not greater than a third threshold is determined.

In a possible implementation, after an echo-free region in a scan image is obtained, the emission power corresponding to the target emission angle may further be kept unchanged, if the area of the target echo-free region is greater than the second threshold, and the solid angle corresponding to the target echo-free region is greater than the third threshold.

Specifically, if the area of the target echo-free region is greater than the first threshold, and the solid angle corresponding to the target echo-free region is greater than the second threshold, it indicates that the detected object in the target echo-free region may be the sky. In some application scenarios, the sky is not used as a detection target of the radar. Therefore, the emission power corresponding to the target emission angle can be kept unchanged in this case. This helps reduce unnecessary power consumption of the radar.

In a possible implementation, a preset angle range may further be obtained; and the reflectivity of the first detection point of the first detection signal is obtained when it is determined that the target emission angle does not fall within the preset angle range.

In a possible implementation, after a preset angle range is obtained, the emission power corresponding to the target emission angle may further be kept unchanged when the target emission angle falls within the preset angle range.

The radar usually scans some unrelated objects in some of the angle ranges. For example, for emission angles of the upper half part in a vertical direction, a detected object in directions of the emission angles is usually the sky. Therefore, an angle range in which the emission angles of this part are located may be set to the preset angle range. According to the foregoing method, the emission power corresponding to the target emission angle within the preset angle range can be kept unchanged. This helps reduce unnecessary power consumption of the radar.

In a possible implementation, after the keeping the emission power corresponding to the target emission angle unchanged, the method further includes: increasing the emission power corresponding to the target emission angle if a quantity of times that the emission power corresponding to the target emission angle is continuously kept unchanged reaches a preset fourth threshold.

According to the foregoing method, after the emission power corresponding to the target emission angle is kept unchanged for a plurality of consecutive times because the detected object in the direction of the target emission angle is suspected to be the sky, the emission power corresponding to the target emission angle is increased once, to keep detection of an object that may appear in the sky.

In a possible implementation, the reflectivity of the first detection point of the first detection signal may further be obtained after it is determined that a preset feature object does not include the detected object. In addition, the emission power corresponding to the target emission angle may be kept unchanged if it is determined that the preset feature object includes the detected object.

According to the foregoing method, objects that may be easily damaged by the detection signal, such as a pedestrian, and a photosensitive device are provided as the feature object, to prevent high-power detection signal damaging these objects after the radar increases the detection signal.

In a possible implementation, after a reflectivity of a first detection point of the first detection signal is obtained, the emission power corresponding to the target emission angle is kept unchanged if the reflectivity of the first detection point is not greater than the first threshold.

According to the foregoing method, if the reflectivity of the first detection point is not greater than the first threshold, it indicates that the echo signal may not be received because the reflectivity of the first detection point is excessively small. In this case, the emission power corresponding to the target emission angle may not be increased. This helps reduce unnecessary power consumption of the radar, and also protect the detected object to which the first detection point belongs.

In a possible implementation, after emission power corresponding to the target emission angle is increased, a second detection signal may further be emitted at the target emission angle based on increased emission power. A distance between a second detection point of the second detection signal and the radar is obtained based on an echo signal corresponding to the second detection signal. Emission power corresponding to the target emission angle is reduced if the distance between the second detection point and the radar is greater than a fifth threshold; and/or emission power corresponding to the target emission angle is kept unchanged if the distance to the second detection point is not greater than the fifth threshold.

According to the foregoing method, if the distance between the second detection point and the radar is excessively long, it indicates that the distance to a detected object to which the second detection point belongs is excessively far, and exceeds a rated detection distance set in the radar (a fifth threshold), and the radar does not need to measure the second detection point. In this case, the radar can reduce the emission power, and does not measure the detected object. This helps reduce unnecessary power consumption of the radar.

In a possible implementation, after a second detection signal is emitted at the target emission angle, the emission power corresponding to the target emission angle is reduced if a quantity of times that the echo signal corresponding to the second detection signal is continuously not received reaches a sixth threshold.

According to the foregoing method, if the second detection signal is emitted by using the increased emission power, and no echo signal of the second detection signal is received for a plurality of consecutive times, it indicates that the detected object in the direction of the target emission angle may be the sky. In this case, the emission power corresponding to the target emission angle may be reduced. This helps reduce unnecessary power consumption of the radar.

In a possible implementation, when a reflectivity of a first detection point of the first detection signal is obtained, the reflectivity of the first detection point may be calculated based on the signal power of the echo signal of the first detection signal; and/or an optical image of the first detection point may be processed by using an image recognition algorithm, to obtain the reflectivity of the first detection point.

In a possible implementation, if the signal power of the echo signal of the first detection signal is less than the preset power threshold, the reflectivity of the first detection point of the first detection signal may be obtained after it is determined that a moving speed of the radar is greater than a preset seventh threshold.

A vehicle-mounted radar is used as an example. If a moving speed of the vehicle-mounted radar is relatively high, it indicates that there is no obstacle in front of the vehicle-mounted radar. In this case, a detection task of the vehicle-mounted radar should be mainly to detect a distant object. Therefore, the radar may obtain an echo-free region in a first scan image, and perform the method provided in the first aspect and other possible implementations of the first aspect, so that the radar may detect a farther object.

According to a second aspect, an embodiment of this application provides an apparatus, including: an emission unit, configured to emit a first detection signal at a target emission angle based on emission power corresponding to the target emission angle, where the target emission angle is an emission angle included in a plurality of emission angles of a radar; and a processing unit, configured to: obtain signal power of an echo signal of the first detection signal, where the first detection signal is emitted by the radar to the target emission angle based on the emission power corresponding to the target emission angle, and the target emission angle is the emission angle included in the plurality of emission angles of the radar; obtain a reflectivity of a first detection point of the first detection signal if the signal power of the echo signal of the first detection signal is less than a preset power threshold, where the first detection point is a point on a surface of a detected object in a direction of the target emission angle; and increase the emission power corresponding to the target emission angle if the reflectivity of the first detection point is greater than a preset first threshold.

In a possible implementation, after obtaining an echo-free region in a scan image, the processing unit may further obtain the echo-free region in the scan image, where the scan image is obtained based on echo signals of detection signals emitted at the plurality of emission angles, and the echo-free region is a region corresponding to a plurality of spatially continuous echo signals whose signal power is less than a power threshold and whose quantity is greater than a preset quantity; and determine that an area of a target echo-free region including the first detection point is not greater than a second threshold, and/or a solid angle corresponding to a target echo-free region is not greater than a third threshold.

In a possible implementation, after obtaining the echo-free region in the scan image, the processing unit may further keep the emission power corresponding to the target emission angle unchanged, if the area of the target echo-free region is greater than the second threshold, and the solid angle corresponding to the target echo-free region is greater than the third threshold.

In a possible implementation, before obtaining the reflectivity of the first detection point of the first detection signal, the processing unit may further obtain a preset angle range; and determine that the target emission angle does not fall within the preset angle range.

In a possible implementation, after obtaining the preset angle range, the processing unit may further keep the emission power corresponding to the target emission angle unchanged if the target emission angle falls within the preset angle range.

In a possible implementation, after keeping the emission power corresponding to the target emission angle unchanged, the processing unit may further increase the emission power corresponding to the target emission angle if a quantity of times that the emission power corresponding to the target emission angle is continuously kept unchanged reaches a preset fourth threshold.

In a possible implementation, before obtaining the reflectivity of the first detection point of the first detection signal, the processing unit may further determine that a preset feature object does not include the detected object, and then obtain the reflectivity of the first detection point of the first detection signal.

In a possible implementation, the processing unit may further keep the emission power corresponding to the target emission angle unchanged if the preset feature object includes the detected object.

In a possible implementation, after obtaining the reflectivity of the first detection point of the first detection signal, the processing unit may further keep the emission power corresponding to the target emission angle unchanged if the reflectivity of the first detection point is not greater than the first threshold.

In a possible implementation, after the processing unit increases the emission power corresponding to the target emission angle, the emission unit may further emit a second detection signal at the target emission angle based on increased emission power; and the processing unit may further obtain a distance between a second detection point of the second detection signal and the apparatus based on an echo signal corresponding to the second detection signal; reduce the emission power corresponding to the target emission angle if the distance between the second detection point and the apparatus is greater than a fifth threshold; and/or keep the emission power corresponding to the target emission angle unchanged if the distance between the second detection point and the apparatus is not greater than the fifth threshold.

In a possible implementation, after the emission unit emits the second detection signal at the target emission angle, the processing unit may further reduce the emission power corresponding to the target emission angle if a quantity of times that the echo signal corresponding to the second detection signal is continuously not received reaches a sixth threshold.

In a possible implementation, when obtaining the reflectivity of the first detection point of the first detection signal, the processing unit may calculate the reflectivity of the first detection point based on the signal power of the echo signal of the first detection signal; and/or process an optical image of the first detection point by using an image recognition algorithm, to obtain the reflectivity of the first detection point.

In a possible implementation, before obtaining the reflectivity of the first detection point of the first detection signal if the signal power of the echo signal of the first detection signal is less than the preset power threshold, the processing unit may further determine that a moving speed of the radar is greater than a preset seventh threshold.

According to a third aspect, an embodiment of this application provides an apparatus, including a processor and a transceiver. The transceiver is configured to emit a detection signal, and receive an echo signal of the detection signal. The processor is configured to perform, by running program instructions, the method according to any one of the first aspect according to the echo signal of the detection signal received by the transceiver.

According to a fourth aspect, an embodiment of this application provides a readable storage medium, including program instructions. When the program instructions are run on a computer, the computer can be enabled to perform the method provided in any one of the first aspect.

According to a fifth aspect, an embodiment of this application provides a program product. When the program product runs on a computer, the computer can be enabled to perform the method provided in any one of the first aspect.

These aspects or other aspects of this application are clearer and more comprehensible in descriptions of the following embodiments.

DESCRIPTION OF EMBODIMENTS

The following further describes this application in detail with reference to the accompanying drawings. A specific operation method in a method embodiment may also be applied to an apparatus embodiment or a system embodiment. It should be noted that in the description of this application, "at least one" means "one or more". "A plurality of" means two or more. In view of this, "a plurality of" in the embodiments of this application may also be understood as "at least two". In addition, it should be understood that in the description of this application, terms such as "first" and "second" are merely used for distinguishing and description, but should not be understood as indicating or implying relative importance, or should not be understood as indicating or implying a sequence.

A radar is often used to detect an object. There are different types of commonly used radars, such as a lidar, and a millimeter-wave radar. The lidar is used as an example. The lidar is also be referred to as a LiDAR radar, and the LiDAR radar may emit a laser beam to detect a distance between a target object and the radar. Generally, a resolution of the radar is related to a wavelength of a detection signal emitted by the radar. Because the lidar uses the laser beam as the detection signal, and a wavelength of the laser beam is about 100000 times shorter than a wavelength of a conventional radio detection signal, the lidar having a relatively high resolution can distinguish a real moving pedestrian and a character poster, model in three-dimensional space, detect a static object, accurately measure a distance, and the like. Therefore, the lidar is often used as a radar with a high accuracy requirement, such as a vehicle-mounted radar, or an airborne radar.

Figure 1:
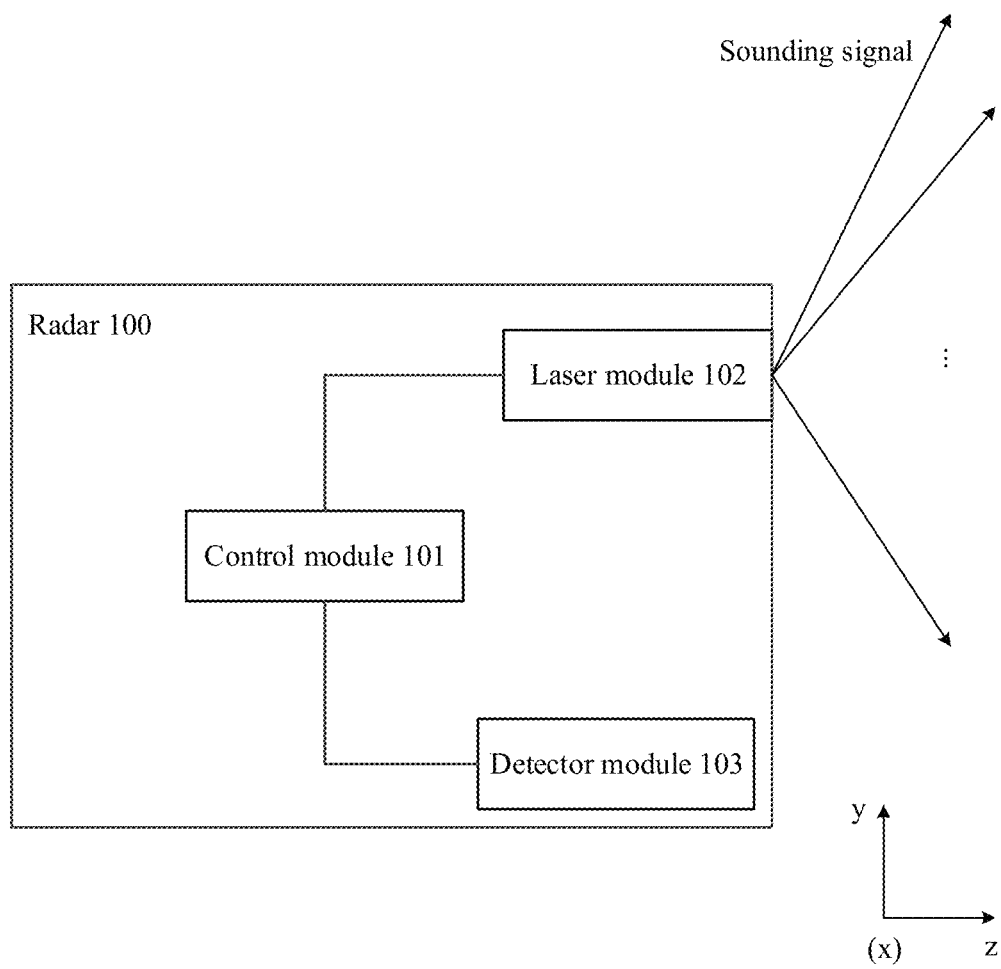
FIG. 1 is a schematic diagram of a structure of a radar.

FIG. 1 is a schematic diagram of a structure of a radar. As shown in FIG. 1, the radar 100 includes a control module 101, a laser module 102, and a detector module 103. It should be understood that the radar 100 may be a radar system, and the control module 101, the laser module 102, and the detector module 103 are used as independent hardware entities in the radar system. The radar 100 may also be a radar device, and the control module 101, the laser module 102, and the detector module 103 are used as hardware modules integrated in the radar device. This is not limited in this embodiment of this application.

Figure 2:
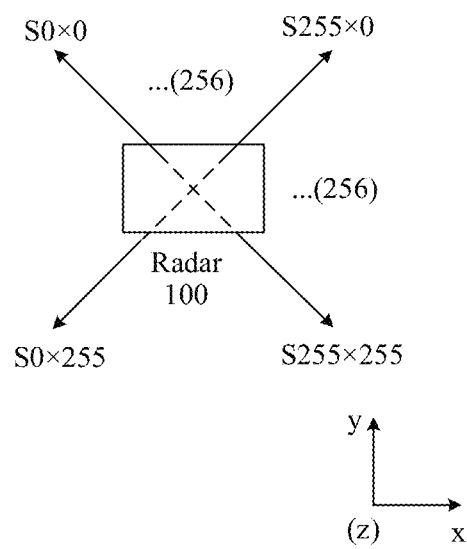
FIG. 2 is a schematic diagram of an emission angle of a radar.

In a working process of the radar 100, an emission angle of the laser module 102 can be switched to complete scanning of a scanning angle range. There are usually two common scanning modes: point scan and line scan. The point scan is used as an example. A plurality of emission angles are preset within the scanning angle range of the radar 100. As shown in FIG. 1, the radar 100 may sequentially emit detection signals to the plurality of emission angles to obtain a scan image corresponding to the scanning angle range, and further analyze the scan image to obtain features of one or more detected objects within the scanning angle range, such as three-dimensional shapes, positions, and forms. It should be understood that, in FIG. 1, only a yz plane formed in a y direction and a z direction is used as an example to illustrate the plurality of emission angles of the radar 100. In an actual scanning process, the radar 100 may not only switch the emission angle on the yz plane, but also can switch the emission angle on an xy plane perpendicular to the yz plane, as shown in FIG. 2. The control module 101 may control the laser module 102 to sequentially emit a laser pulse, namely, the detection signal, to each emission angle shown in FIG. 1 and FIG. 2 in a preset scanning sequence. Therefore, the radar 100 has completed one scanning.

In this embodiment of this application, the laser module 102 may emit visible light or infrared light as the detection signal. However, because the visible light may be perceived by human eyes, maximum power needs to be limited to avoid harm to the human eyes. In addition, the laser module 102 may also emit laser light with a wavelength of 1550 nm. The laser light with the wavelength of 1550 nm is invisible to the human eyes, and therefore does not cause harm to the human eyes at high power. The laser light with the wavelength of 1550 nm may be used for measurement for a purpose of long-distance detection and low-precision detection. Moreover, the laser light with the wavelength of 1550 nm is invisible to night vision goggles, and therefore can also be used in the military field. In consideration of costs and feasibility, when the radar 100 is used as a vehicle-mounted radar, the laser module 102 may emit laser light with a wavelength of 905 nm.

In this embodiment of this application, the detector module 103 may detect an echo signal, for example, the detector module 103 in the lidar may detect a laser pulse reflected back to the radar 100 (an echo signal), and converts the echo signal from the laser pulse to a digital signal or an analog signal through optoelectronic conversion. Specifically, the detector module 103 may be any one or more of a silicon avalanche photodiode (avalanche photodiode, APD), an APD array, and a single photon avalanche photodiode (single photon avalanche photodiode, SPAD) detector array. An APD is an analog component, and an output signal increases as intensity of input light increases. A minimum unit of the SPAD array is an SPAD, and the SPAD has only a single photon detection function. Therefore, once receiving at least one photon, any SPAD outputs a signal of same amplitude.

In addition, the radar 100 in this embodiment of this application may be further installed on a mobile platform, such as a satellite, aircraft, or an automobile. In this case, the radar 100 needs assistance of another apparatus in the mobile platform to determine a current position and steering information of the radar 100, to ensure availability of detected data. For example, the mobile platform may further include a global positioning system (global positioning system, GPS) apparatus and an inertial measurement unit (inertial measurement unit, IMU) apparatus. The radar 100 may obtain, based on detected data of the GPS apparatus and the IMU apparatus, a feature quantity of a target object, such as a position, and a speed. Specifically, the radar 100 may provide geographic position information of the mobile platform by using the GPS apparatus in the mobile platform, and record a posture and the steering information of the mobile platform by using the IMU apparatus. After determining a distance between the radar 100 and the target object based on the echo signal, the radar 100 may convert a measurement point of the target object from a relative coordinate system to a position point on an absolute coordinate system based on the geographic position information provided by the GPS apparatus or the posture and the steering information provided by the IMU apparatus, to obtain geographical position information of the target object. Therefore, the radar 100 can be applied to the mobile platform.

Figure 3:
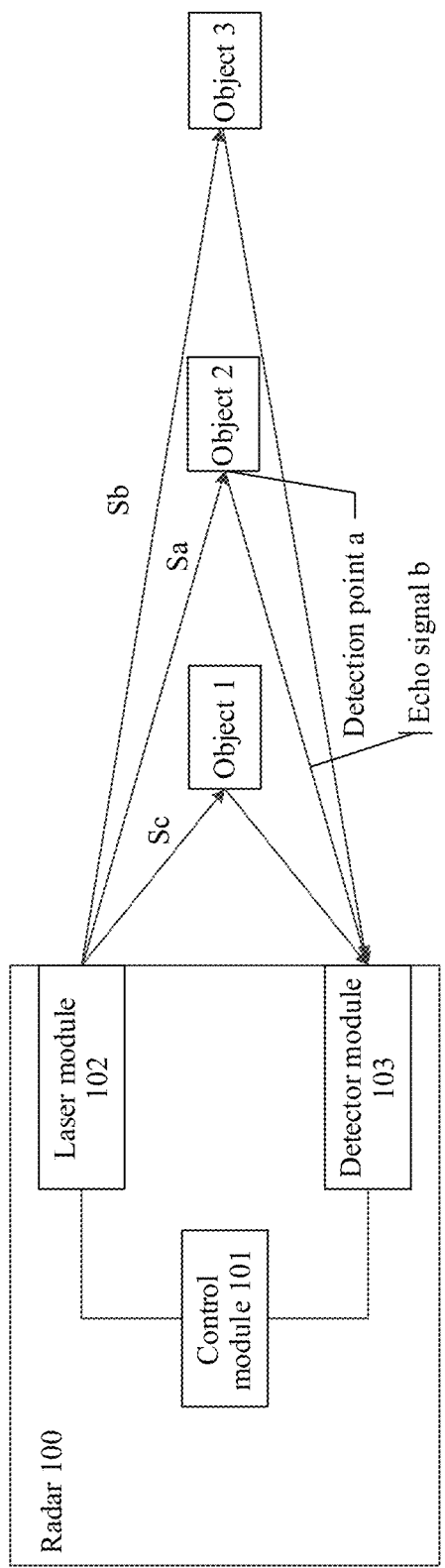
FIG. 3 is a schematic diagram of radar detection.

Generally, each time the radar 100 completes one scanning, the radar 100 may obtain a scan image based on the echo signal of the detection signal emitted during the scanning process. One detection signal usually corresponds to one pixel in the scan image. For example, if the radar emits detection signals to a plurality of emission angles shown in FIG. 2, the radar can obtain a scan image with a resolution of 256×256. A detection signal Sa in FIG. 3 is used as an example. The detection signal Sa is a detection signal emitted by the radar 100 to an emission angle a. The emission angle a is any emission angle in the plurality of emission angles shown in FIG. 2. There is an object 2 in a direction of the emission angle a. After the radar 100 emits the detection signal Sa, the detection signal Sa is reflected on a surface of the object 2, and a point where the detection signal Sa is reflected on the surface of the object 2 may also be referred to as a detection point of the detection signal Sa. The radar 100 detects a detection signal Sa reflected from the surface of the object 2, namely, an echo signal of the detection signal Sa, and may further obtain scanning information of the detection point a based on the echo signal, such as a distance, and a reflectivity. The scanning information of the detection point a may be displayed in a form of one pixel in the scan image.

Figure 4:
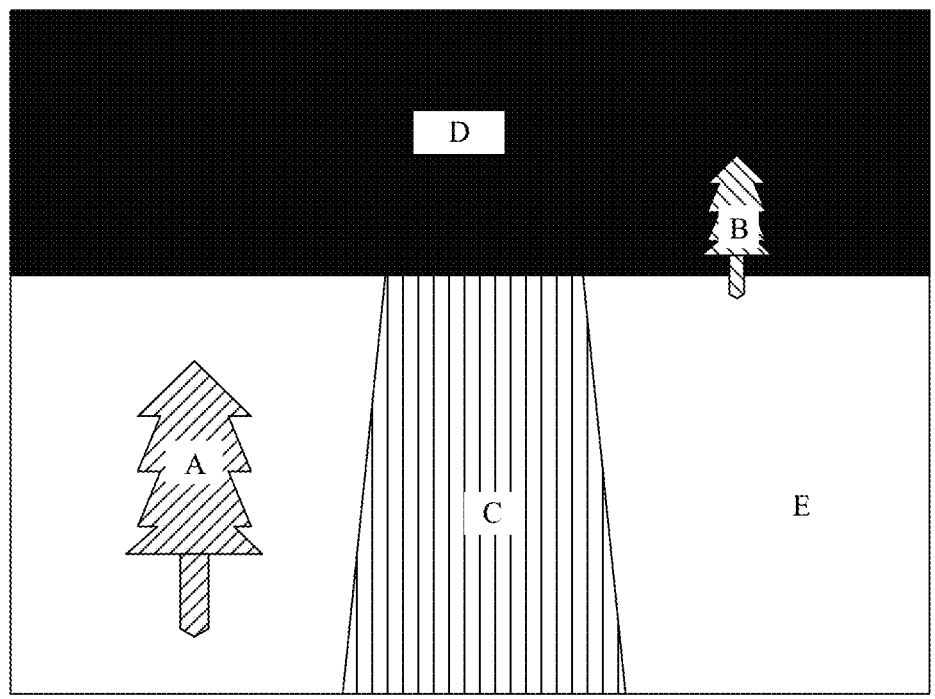
FIG. 4 is a schematic diagram of a possible scan image.

In the foregoing process, after emitting a plurality of detection signals to the plurality of emission angles shown in FIG. 2, the radar 100 may obtain the scan image with the resolution of 256×256 based on a plurality of detected echo signals. Each pixel in the scan image corresponds to scanning information of one detection point. The radar 100 may further analyze the scan image to obtain the features of the one or more detected objects within the scanning angle range, such as the three-dimensional shapes, the positions, and the forms. FIG. 4 is a schematic diagram of a possible scan image. The scan image shown in FIG. 4 may be analyzed to obtain features such as distances and states of detected objects such as a tree A, a tree B, a street C, and an open space E within a scanning angle range.

However, if a detected object in a direction of a specific emission angle is excessively far from the radar 100 or a reflectivity of a surface of a detected object is excessively low, signal power of an echo signal may be excessively small. As a result, the detector module 103 cannot detect the echo signal. Alternatively, quality of the echo signal detected by the detector module 103 is relatively poor, and consequently the detected echo signal cannot be used to accurately calculate the scanning information of the detection point. As shown by an object 3 in FIG. 3, although the object 3 may also reflect a detection signal Sb, because the object 3 is excessively far, signal power is excessively low when an echo signal from the object 3 reaches the radar 100. As a result, the detector module 103 cannot detect the echo signal. For another example, as shown by an object 1 in FIG. 3, although the object 1 is relatively close to the radar 100, because a reflectivity of a surface of the object 1 is excessively low, only a small part of detection signals Sc are reflected when the detection signals Sc reach the surface of the object 1, and further signal power of an echo signal detected by the radar 100 is excessively low. As a result, the detector module 103 cannot accurately calculate the scanning information of the detection point of the detection signal Sc based on the echo signal.

Figure 5:
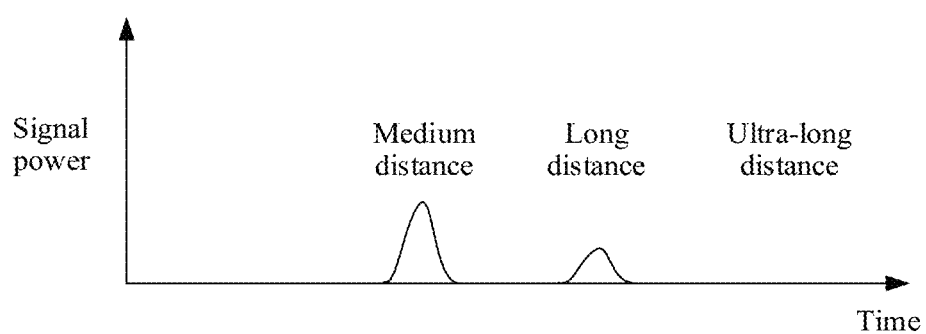
FIG. 5 is a schematic diagram 1 of a relationship between a distance and signal power of an echo signal.
Figure 6:
FIG. 6 is a schematic diagram 2 of a relationship between a distance and signal power of an echo signal.
Figure 7:
FIG. 7 is a schematic diagram 3 of a relationship between a distance and signal power of an echo signal.

FIG. 5 is a relationship between signal power of an echo signal and a distance between a detected object and a radar 100 without considering a reflectivity. The signal power of the echo signal decreases gradually with increase of the distance. For an ultra-long-distance detected object, the radar 100 is not able to detect an echo signal returned by the detected object, as shown in FIG. 6. If emission power is increased, signal power of an echo signal may be increased, as shown in FIG. 7.

Due to the foregoing reasons, a part region in the scan image obtained by the radar 100 is an echo-free region, such as, an echo-free region D in FIG. 4, where the echo-free region is a region in which signal power of an echo signal detected by the radar 100 is less than a preset power threshold in the scan image. As a result, the radar 100 cannot accurately measure the detected object in the echo-free region D.

In one solution, if there is the echo-free region D in the scan image, the radar 100 may increase emission power of a detection signal emitted at each emission angle in next scanning, and therefore increase signal power of an echo signal corresponding to each detection signal, so that the radar 100 can detect a farther distance.

However, the solution excessively increases power consumption of the radar 100. In addition, if reflectivities of some detection points in the echo-free region D are excessively low, the radar 100 cannot detect the echo signals reflected back by the detection points. Increasing the emission power of the detection signals may also damage a detected object to which the detection points belong. For example, if the detected object in the echo-free region D is a darker-skinned pedestrian, a reflectivity on the skin to the detection signal is relatively low, and the pedestrian is relatively close to the radar 100, the radar 100 increases the emission power of the laser pulse (the detection signal), and the skin of the pedestrian may be burned by the laser pulse. For another example, if the detected object in the echo-free region D is a photosensitive device whose surface has a low reflectivity, and the photosensitive device is relatively close to the radar 100, the radar 100 increases the emission power of the laser pulse (the detection signal), and the laser pulse emitted by the radar 100 may damage a photosensitive element in the photosensitive device.

In another solution, if there is the echo-free region D in the scan image, the radar 100 may increase emission power of a detection signal emitted at each emission angle, and increase a wavelength of the detection signal in next scanning. If the radar 100 is further provided with a detector module having a higher precision, the detector module having the higher precision may also be turned on simultaneously. In this solution, although damage from the high-power detection signal to the nearby object may be reduced, it is not help reduce power of the radar 100 and costs of the radar 100.

Based on this, the embodiments of this application provide a radar power control method. The method may be applied to a radar 100 or a control module 101 in the radar 100. Corresponding emission power is configured for each of emission angles of the radar 100. Whether to increase emission power corresponding to an emission angle of a detection signal is determined based on signal power of an echo signal of the detection signal and a reflectivity of a detection point of the detection signal. This helps consider both power consumption and a detection distance of the radar. It should be understood that, when the method is applied to the control module 101, the control module 101 may be implemented by controlling a laser module 102 and a detector module 103. The following uses the radar 100 as an example to describe the radar power control method provided in the embodiments of this application in detail.

EMBODIMENT 1

Figure 8A:
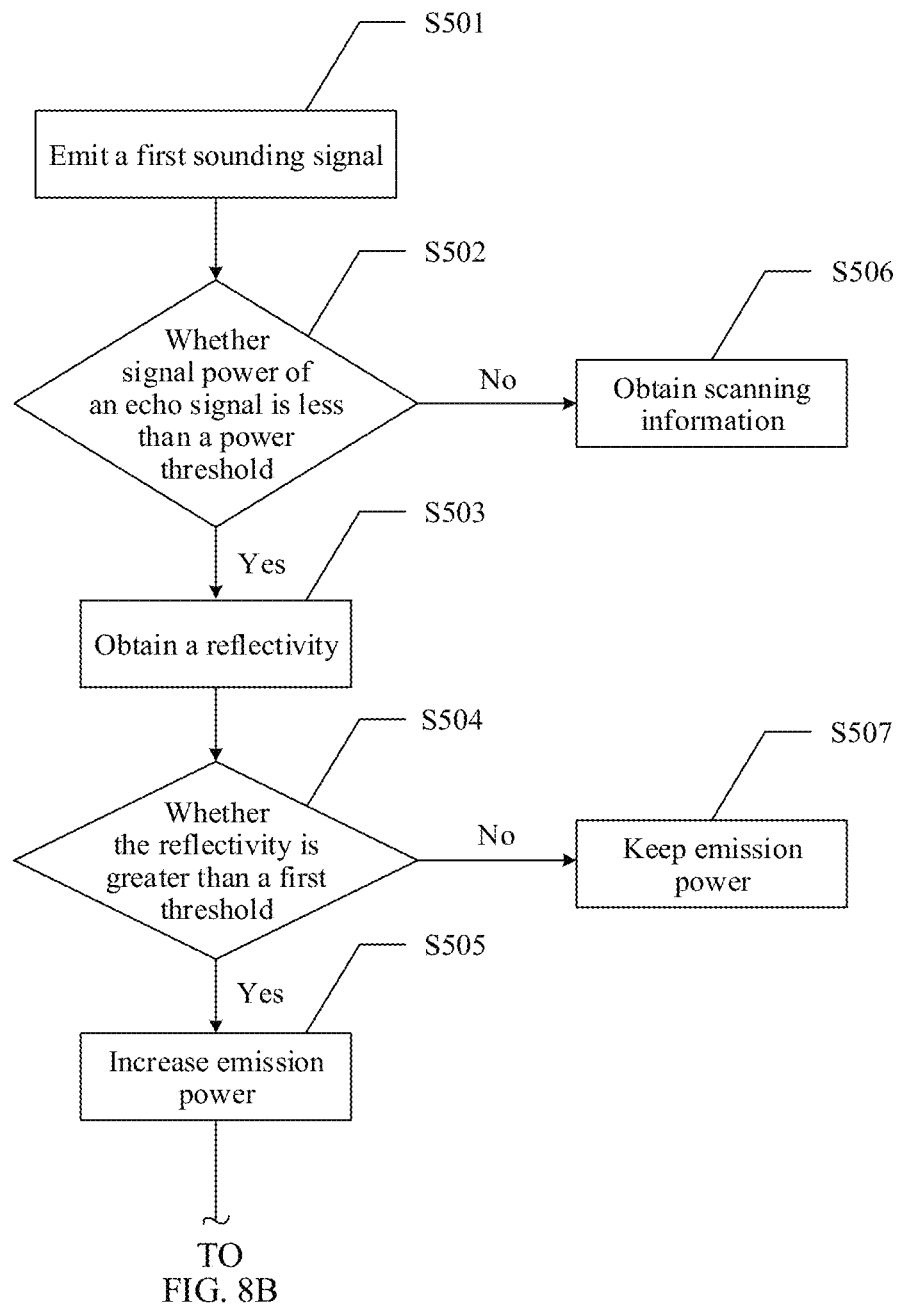
FIG. 8(A) and FIG. 8(B) are a schematic flowchart of a radar power control method according to an embodiment of this application.
Figure 8B:
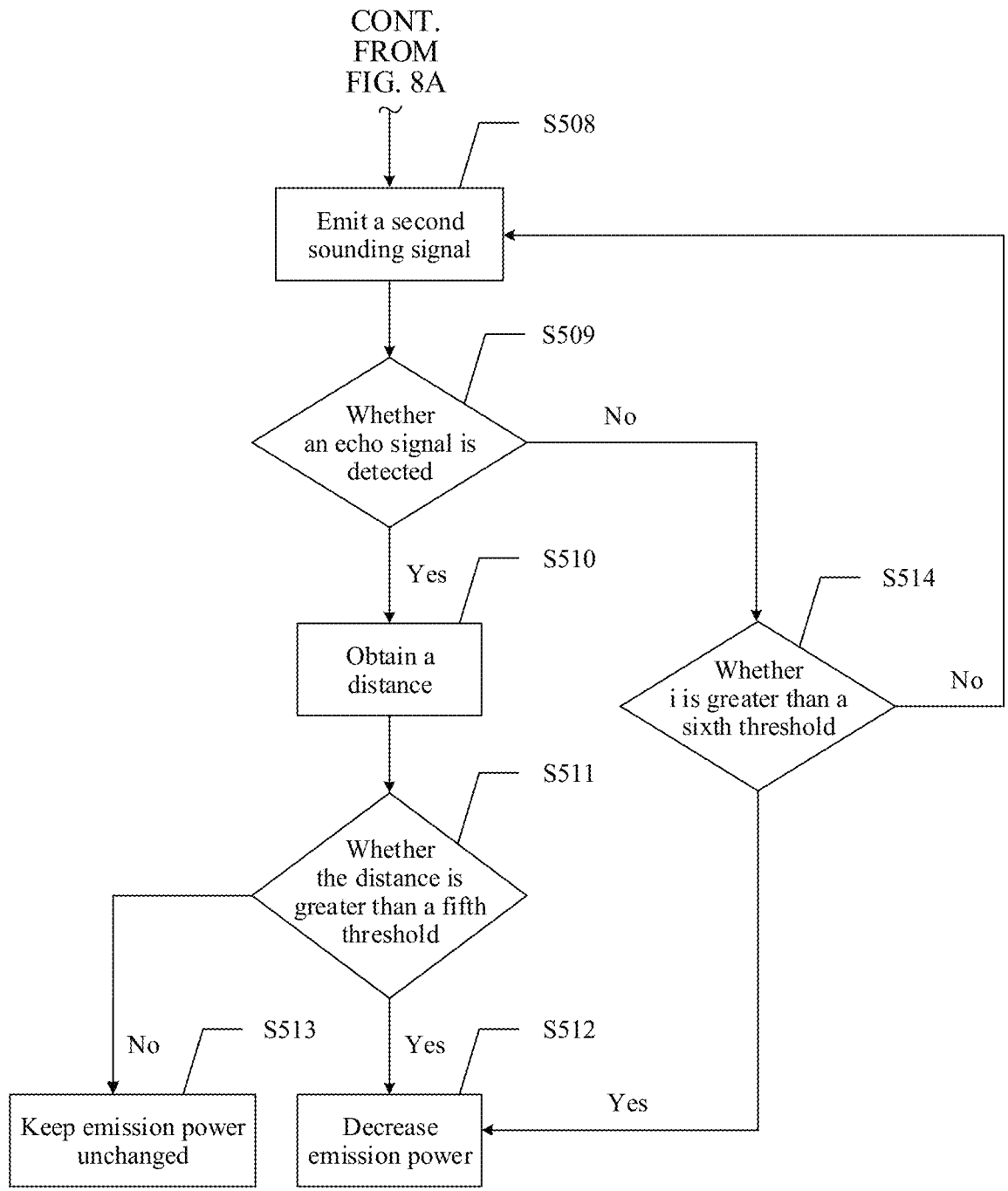

FIG. 8(A) and FIG. 8(B) are an example of a radar power control method provided in an embodiment of this application. As shown in FIG. 8(A) and FIG. 8(B), the method mainly includes the following steps.

S501: The radar 100 emits a first detection signal.

In this embodiment of this application, a plurality of emission angles of the radar 100 correspond to same or different emission power. In a process of scanning within a scanning angle range, the radar 100 may emit a detection signal based on emission power corresponding to each emission angle. For example, a target emission angle is an emission angle a, and emission power corresponding to the emission angle a is 5 w. The radar 100 may emit a first detection signal (a detection signal Sa) at the emission angle a by using emission power of 5 w. It should be noted that in this embodiment of this application, the target emission angle may be specifically one of the plurality of emission angles of the radar 100, or may be each of the plurality of emission angles of the radar 100, that is, each emission angle of the radar 100 is applied to the method provided in this embodiment of this application.

In this embodiment of this application, the radar 100 may be mounted on a mobile platform. Based on this, in a possible implementation, the radar 100 may perform S501 after determining that a current moving speed is greater than a preset seventh threshold and lasts for a specific time period. Specifically, if the moving speed of the radar 100 is relatively high, it indicates that there is no obstacle in front, and a detection task of the radar 100 should be mainly to detect a distant object. In this case, the radar 100 starts to perform the method provided in this embodiment of this application, to prolong a detection distance.

S502: The radar 100 determines whether signal power of an echo signal is less than a power threshold. If the signal power of the echo signal is less than the power threshold, the radar 100 performs S503 of obtaining a reflectivity of a first detection point of the first detection signal.

In a possible implementation, if the signal power of the echo signal of the first detection signal is not less than the preset power threshold, the radar 100 may further perform S506 of obtaining scanning information of a first detection point based on the echo signal of the first detection signal. For a specific implementation process of S506, refer to the conventional technology, and details are not described in this embodiment of this application.

In this embodiment of this application, the power threshold may be set based on detection performance of a detector module 103 in the radar 100. For example, if the detector module 103 can relatively accurately detect an echo signal whose signal power is greater than 0.004 w, that is, signal quality of the detected echo signal whose signal power is greater than 0.004 w is relatively high, but signal quality of a detected echo signal whose signal power is less than 0.004 w is poor, the power threshold may be set to 0.004 w.

The detection signal Sa is used as an example. It is assumed that signal power of an echo signal of the detection signal Sa is 0.002 w, and the signal power is less than the preset power threshold. Therefore, a detection point a may be a point in an echo-free region D in a scan image obtained in this scanning process. In this case, the radar 100 may obtain the reflectivity of the detection point a.

In S503, the radar 100 may obtain the reflectivity of the detection point at least in the following two possible implementations.

In a possible implementation, the radar 100 may obtain the reflectivity of the first detection point through calculation based on the signal power of the echo signal of the detection signal Sa. Specifically, after obtaining the echo signal of the detection signal Sa, the radar 100 may obtain a phase difference between the echo signal and the detection signal Sa, so as to calculate a distance between the detection point a and the radar 100. It can be understood that a power difference between the echo signal and the detection signal Sa is mainly affected by the distance between the detection point a and the radar 100 and the reflectivity of the detection point a. After obtaining the distance between the detection point a and the radar 100, the radar 100 may obtain the reflectivity of the detection point a based on calculated information such as the distance and a power ratio of the signal power between the echo signal and the detection signal Sa.

In another possible implementation, the radar 100 may further process an optical image of the first detection point by using an image recognition algorithm, to obtain the reflectivity of the first detection point. Specifically, the radar 100 may be mounted with an image device, and the image device collects the optical image of the first detection point. The image device can collect an optical image of a plurality of detection points at a time, and even can collect an optical image within the entire scanning angle range at a time. For example, the optical image that is within the entire scanning angle range and that is collected by the image device at a time may be shown in FIG. 9, and the optical image corresponds to the scan image shown in FIG. 4. It can be seen from the optical image in FIG. 9 that a region that is in the optical image and that corresponds to the echo-free region D includes a distant tree f, a distant open space i, a distant street h, and the sky g. The radar 100 may locate the first detection point in the optical image based on a relationship between the emission angle of the first detection signal and a photographing angle of the image device, and further obtain the reflectivity of the first detection point. For example, if the first detection point is a point on a trunk of the distant tree f, the radar 100 may calculate, based on the optical image shown in FIG. 9, a reflectivity of the trunk of the tree f by using an image recognition algorithm such as a gray image processing algorithm, or a machine learning algorithm, to obtain the reflectivity of the first detection point. According to the foregoing method, the radar 100 may obtain the reflectivity of the first detection point even if the signal power of the echo signal of the first detection signal is 0.

S504: The radar 100 determines whether the reflectivity of the first detection point is greater than a first threshold.

If the reflectivity of the first detection point is greater than the first threshold, it indicates that the reflectivity of the first detection point has relatively little impact on signal power attenuation of the echo signal. The signal power of the echo signal may be excessively low (lower than the power threshold) because the distance between the first detection point and the radar 100 is excessively far. In this case, the radar 100 may perform S505 of increasing emission power corresponding to a target emission angle, that is, the radar 100 may emit a detection signal at the target emission angle by using greater emission power in a next scanning process. In S508 in FIG. 8(B), the radar 100 emits a second detection signal at the target emission angle based on the increased emission power in the next scanning process, to detect a farther object in a direction of the target emission angle.

In a possible implementation, if the reflectivity of the first detection point is not greater than the first threshold, it indicates that the signal power of the echo signal may be excessively low because the reflectivity of the first detection point is excessively low. In this case, the radar 100 may perform S507 of keeping emission power corresponding to a target emission angle unchanged. This helps reduce unnecessary power consumption of the radar, and protect a detected object to which the first detection point belongs. For example, if the detected object is a darker-skinned pedestrian, the emission power corresponding to the target emission angle is kept unchanged. This helps prevent a skin of the pedestrian from being burned by a laser pulse. For another example, if the detected object is a photosensitive device whose surface has a relatively low reflectivity, the emission power corresponding to the target emission angle is kept unchanged. This helps prevent a detection signal from damaging a photosensitive element in the photosensitive device.

Generally, the radar 100 is configured with a rated detection distance. The radar 100 may not measure a detected object whose distance is greater than the rated detection distance. Based on this, as shown in FIG. 8(B), after emitting the second detection signal, the radar 100 may further perform S509 of detecting an echo signal of the second detection signal. If the radar 100 detects the echo signal of the second detection signal (or signal power of the echo signal of the second detection signal is greater than the foregoing power threshold), the radar 100 may perform S510 of obtaining a distance of a second detection point of the second detection signal and the radar based on the echo signal corresponding to the second detection signal. For a specific process of obtaining the distance between the second detection point and the radar, refer to the foregoing embodiment, and details are not described herein again.

S511: The radar 100 determines whether the distance between the second detection point and the radar is greater than a fifth threshold.

The fifth threshold may be the rated detection distance of the radar 100. If the distance between the second detection point and the radar is greater than the fifth threshold, it indicates that the second detection point exceeds the rated detection distance of the radar 100, and the radar 100 may not measure the second detection point. In this case, the radar 100 may perform S512 of reducing emission power corresponding to the target emission angle. This helps reduce unnecessary power consumption of the radar 100. In this embodiment of this application, the radar 100 may reduce the emission power corresponding to the target emission angle to the emission power for emitting the first detection signal, or to other emission power. This is not limited.

As shown in FIG. 8(B), if the distance between the second detection point and the radar is not greater than the fifth threshold, it indicates that the second detection point is within the rated detection distance of the radar 100, and the radar 100 needs to measure the second detection point. In this case, the radar 100 may keep emission power corresponding to the target emission angle unchanged, that is, continuously emit the second detection signal at the target emission angle by using the higher emission power.

In one possible implementation, the radar 100 may still not receive the echo signal of the second detection signal after emitting the second detection signal (Alternatively, the signal power of the echo signal of the second detection signal is not greater than the foregoing power threshold. The following process is similar, and details are not described herein again.). In this case, in S514 in FIG. 8(B), the radar 100 may accumulate a quantity of times i that the echo signal of the second detection signal is not detected continuously. If i is greater than a preset sixth threshold, the radar 100 performs S512 of reducing emission power corresponding to the target emission angle. Otherwise, the radar 100 performs S508 of continuously emitting a second detection signal at increased emission power.

Specifically, for the radar 100 mounted on the mobile platform, the distance between the radar 100 and the detected object in the direction of the target emission angle is generally changed in a moving process. If i is greater than the preset sixth threshold, it indicates that the distance between the detected object in the direction of the target emission angle and the radar 100 does not decrease as the radar 100 moves, and the detected object may be an undetectable object, such as the sky. In this case, the emission power may be reduced. This helps reduce unnecessary power consumption of the radar 100.

EMBODIMENT 2

In some application scenarios, the radar 100 does not need to detect the sky much. For example, a main detection task of a vehicle-mounted radar should be to detect a condition of an object around a vehicle and a condition of an object in a traveling route. Based on this, in S502 of this embodiment of this application, if signal power of an echo signal of a first detection signal is less than a power threshold, the radar 100 may further determine, in a method shown in FIG. 10, whether a first detection point of the first detection signal is the sky. If the first detection point of the first detection signal is the sky, the radar 100 does not need to increase emission power corresponding to a target emission angle. This helps reduce unnecessary power consumption.

Figure 10:
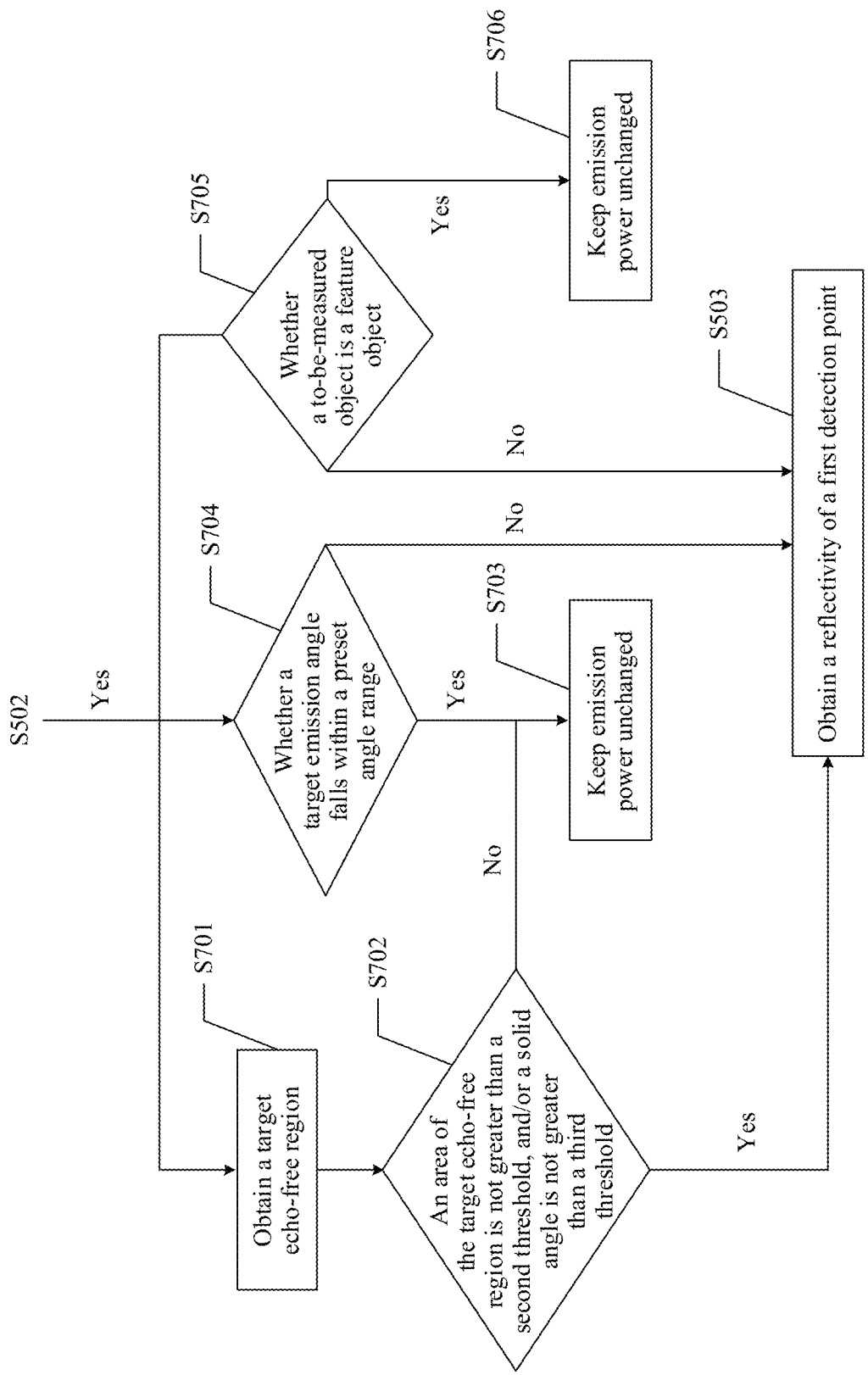
FIG. 10 is a schematic flowchart of a radar power control method according to an embodiment of this application.

Specifically, in S701 in FIG. 10, the radar 100 obtains a scan image based on echo signals of detection signals emitted at a plurality of emission angles, and further obtains an echo-free region in the scan image. In this embodiment of this application, the echo-free region is a region corresponding to a plurality of spatially continuous echo signals whose signal power is less than a power threshold and whose quantity is greater than a preset quantity, for example, the echo-free region D in FIG. 4.

In S702, if that an area of a target echo-free region including the first detection point is not greater than a second threshold is determined, and/or that a solid angle corresponding to the target echo-free region is not greater than a third threshold is determined, the radar 100 performs S503. Otherwise, the radar 100 performs S703 to keep the emission power corresponding to the target emission angle unchanged.

The solid angle is an angle of three-dimensional space, and is an analogy of a plane angle in the three-dimensional space. The solid angle describes a scale of a size of an object detected by an observer standing at a specific point. In this embodiment of this application, the solid angle corresponding to the echo-free region may be understood as a three-dimensional angle formed in a three-dimensional space by emission angles at which various detection signals are emitted when the radar scans the three-dimensional space corresponding to the echo-free region.

Figure 9:
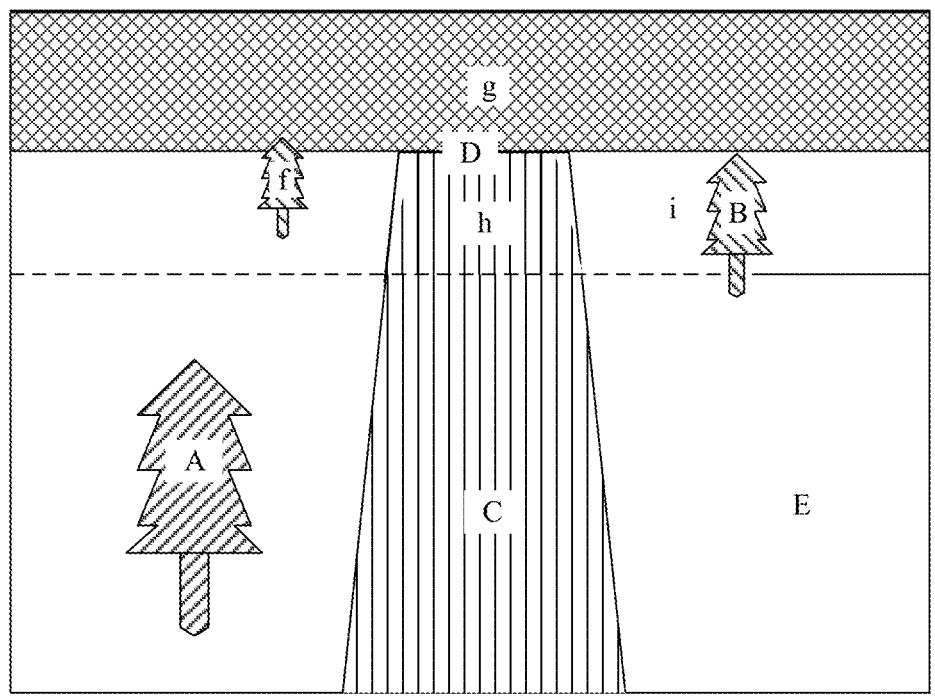
FIG. 9 is a schematic diagram of a possible optical image.

Specifically, if the area of the target echo-free region is greater than the second threshold, the emission power corresponding to the plurality of emission angles in the echo-free region is kept unchanged in an echo-free region whose solid angle is greater than the third threshold. Refer to FIG. 4 and FIG. 9. In an actual working process of the radar 100, the sky g tends to occupy a large area of the scan image, and also has a large solid angle. Therefore, if the area of the target echo-free region is greater than the second threshold, it indicates that the target echo-free region may be the sky, and the radar 100 may keep the emission power of the target emission angle in an echo-free region whose solid angle is greater than the third threshold. This helps reduce unnecessary power consumption.

In addition, this embodiment of this application further provides another method for determining whether the first detection point is the sky. In S704 in FIG. 10, the radar 100 determines whether the target emission angle falls within a preset angle range. If the target emission angle falls within the preset angle range, the radar 100 performs S703. Otherwise, the radar 100 performs S503. For example, in FIG. 4 and FIG. 9, the sky in the scan image of the radar 100 is often located in an upper half region of the scan image. In this case, the preset angle range may be set for the radar 100. For example, sx×0 to sx×60 in FIG. 2 may be set as the preset angle range, where x=(0, 1, . . . , 255). When the echo signal of the first detection signal is less than the power threshold, and the target emission angle falls within the preset angle range, it indicates that the first detection point of the first detection signal may be the sky. Therefore, the radar 100 may further perform S703 of keeping the emission power corresponding to the target emission angle unchanged, to reduce unnecessary power consumption.

In this embodiment of this application, after performing S703, the radar 100 may further accumulate a quantity of times that S703 is continuously performed. If the quantity of times that S703 is continuously performed reaches a fourth threshold, the radar 100 forcibly increases the emission power of the target emission angle. In other words, if the radar 100 does not change the emission power corresponding to the target emission angle because the detection point in a direction of the target emission angle may be the sky in N consecutive scanning process, when N reaches the fourth threshold, the radar 100 increases the emission power corresponding to the target emission angle in an $(N+1)^{th}$ scanning process. According to the foregoing method, after keeping the emission power for the sky relatively low for a plurality of consecutive times, the radar 100 increases the emission power for the sky once, to detect an object that may appear in the sky.

In addition, the radar 100 may further identify whether a detected object to which the first detection point belongs is a preset feature object. It may also be considered that the radar 100 determines whether the preset feature object includes the detected object. Generally, the feature object may be set as a character, a photosensitive device, or the like. In S705 in FIG. 10, if the detected object is the feature object, the radar performs S706 of keeping the emission power unchanged, to prevent the detection signal from damaging the feature object. Otherwise, the radar performs S503.

Specifically, the radar 100 may process an optical image including the first detection point by using an image recognition algorithm such as image classification, a neural network algorithm, or a machine learning algorithm, as shown in FIG. 9. For example, in FIG. 9, the radar 100 first locates an area to which the first detection point belongs, and then identifies the detected object corresponding to the area to which the first detection point belongs in the foregoing image recognition algorithm, and then perform S706 based on the identified detected object.

The foregoing mainly describes the solution provided in this application from a perspective of a method. It may be understood that, to implement the foregoing methods, the radar may include corresponding hardware structures and/or software units for performing the functions. Persons skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on particular applications and design constraint conditions of the technical solutions. Persons skilled in the art may use different methods to implement the described functions for each particular application, but it should not be considered that the implementation goes beyond the scope of this application.

Figure 11:
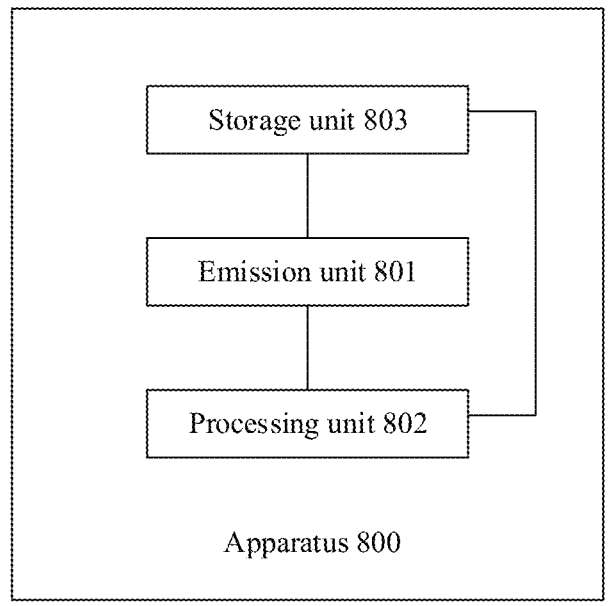
FIG. 11 is a schematic diagram of an apparatus according to an embodiment of this application.

When an integrated unit is used, FIG. 11 is a block diagram of a possible example of an apparatus according to an embodiment of this application. The apparatus 800 may be applied in a form of software, hardware, or a combination of software and hardware in a radar or a control module in the radar. The apparatus 800 may include an emission unit 801 and a processing unit 802. The apparatus 800 may further include a storage unit 803, configured to store program code and data that are of the apparatus 800.

When the apparatus 800 is applied to the radar 100, the emission unit 801 may correspond to the laser module 102. When the apparatus 800 is applied to the control module 101 in the radar 100, the emission unit 801 may correspond to a drive circuit in the control module 101. The processing unit 802 may correspond to the control module 101, and may be implemented by a processor or a controller, for example, may be a general-purpose central processing unit (central processing unit, CPU), a general-purpose processor, digital signal processing (digital signal processing, DSP), an application-specific integrated circuit (application specific integrated circuits, ASIC), a field programmable gate array (field programmable gate array, FPGA), another programmable logic component, a transistor logic component, a hardware component, or any combination thereof. The processing unit 802 may implement or execute example logical blocks, units, and circuits described with reference to content disclosed in this application. The processor may alternatively be a combination of processors implementing a computing function, for example, a combination of one or more microprocessors, or a combination of the DSP and a microprocessor. The storage unit 803 may be a memory.

The apparatus 800 may be the radar in any one of the foregoing embodiments, or may be a semiconductor chip disposed in the radar. The processing unit 802 may support the apparatus 800 in performing the operation of the radar in the foregoing method example.

Specifically, in one embodiment, the emission unit 801 is configured to emit a first detection signal at a target emission angle based on emission power corresponding to the target emission angle, where the target emission angle is an emission angle included in a plurality of emission angles of the radar.

The processing unit 802 is configured to obtain signal power of an echo signal of the first detection signal, where the first detection signal is emitted by the radar to the target emission angle based on the emission power corresponding to the target emission angle, and the target emission angle is the emission angle included in the plurality of emission angles of the radar; obtain a reflectivity of a first detection point of the first detection signal if the signal power of the echo signal of the first detection signal is less than a preset power threshold, where the first detection point is a point on a surface of a detected object in a direction of the target emission angle; and increase the emission power corresponding to the target emission angle if the reflectivity of the first detection point is greater than a preset first threshold.

In a possible implementation, after obtaining an echo-free region in a scan image, the processing unit 802 may further obtain the echo-free region in the scan image, where the scan image is obtained based on echo signals of detection signals emitted at the plurality of emission angles, and the echo-free region is a region corresponding to a plurality of spatially continuous echo signals whose signal power is less than a power threshold and whose quantity is greater than a preset quantity; and determine that an area of a target echo-free region including the first detection point is not greater than a second threshold, and/or a solid angle corresponding to the target echo-free region is not greater than a third threshold.

In a possible implementation, after obtaining the echo-free region in the scan image, the processing unit 802 may further keep the emission power corresponding to the target emission angle unchanged, if the area of the target echo-free region is greater than the second threshold, and the solid angle corresponding to the target echo-free region is greater than the third threshold.

In a possible implementation, before obtaining the reflectivity of the first detection point of the first detection signal, the processing unit 802 may further obtain a preset angle range; and determine that the target emission angle does not fall within the preset angle range.

In a possible implementation, after obtaining the preset angle range, the processing unit 802 may further keep the emission power corresponding to the target emission angle unchanged if the target emission angle falls within the preset angle range.

In a possible implementation, after keeping the emission power corresponding to the target emission angle unchanged, the processing unit 802 may further increase the emission power corresponding to the target emission angle if a quantity of times that the emission power corresponding to the target emission angle is continuously kept unchanged reaches a preset fourth threshold.

In a possible implementation, before obtaining the reflectivity of the first detection point of the first detection signal, the processing unit 802 may further determine that a preset feature object does not include the detected object, and obtain the reflectivity of the first detection point of the first detection signal.

In a possible implementation, the processing unit 802 may further keep the emission power corresponding to the target emission angle unchanged if the preset feature object includes the detected object.

In a possible implementation, after obtaining the reflectivity of the first detection point of the first detection signal, the processing unit 802 may further keep the emission power corresponding to the target emission angle unchanged if the reflectivity of the first detection point is not greater than the first threshold.

In a possible implementation, after the processing unit 802 increases the emission power corresponding to the target emission angle, the emission unit 801 may further emit a second detection signal at the target emission angle based on increased emission power; and the processing unit 802 may further obtain a distance between a second detection point of the second detection signal and the apparatus 800 based on an echo signal corresponding to the second detection signal; reduce the emission power corresponding to the target emission angle if the distance between the second detection point and the apparatus 800 is greater than a fifth threshold; and/or keep the emission power corresponding to the target emission angle unchanged if the distance between the second detection point and the apparatus 800 is not greater than the fifth threshold.

In a possible implementation, after the emission unit emits the second detection signal at the target emission angle, the processing unit 802 may further reduce the emission power corresponding to the target emission angle if a quantity of times that the echo signal corresponding to the second detection signal is continuously not received reaches a sixth threshold.

In a possible implementation, when obtaining the reflectivity of the first detection point of the first detection signal, the processing unit 802 may calculate the reflectivity of the first detection point based on the signal power of the echo signal of the first detection signal; and/or process an optical image of the first detection point by using an image recognition algorithm, to obtain the reflectivity of the first detection point.

In a possible implementation, before obtaining the reflectivity of the first detection point of the first detection signal if the signal power of the echo signal of the first detection signal is less than the preset power threshold, the processing unit 802 may further determine that a moving speed of the radar is greater than a preset seventh threshold.

Figure 12:
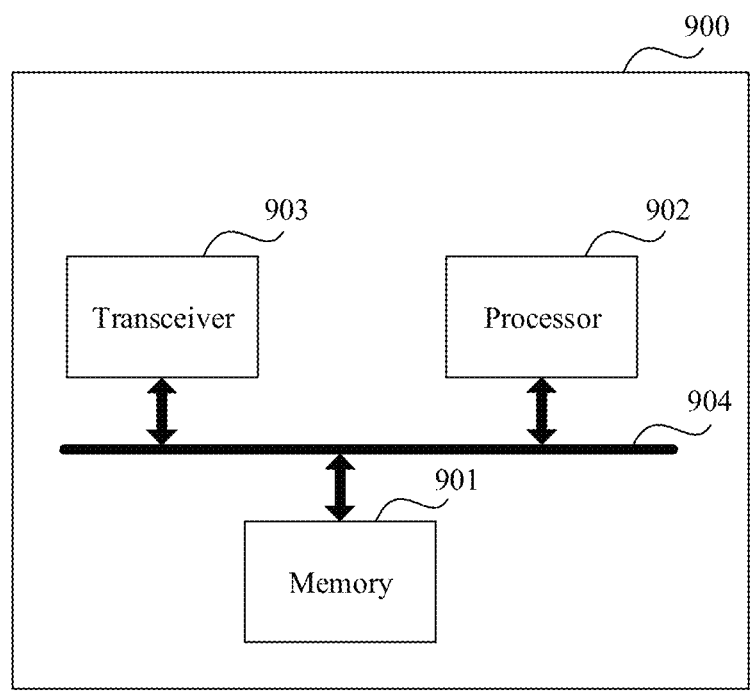
FIG. 12 is a schematic diagram of an apparatus according to an embodiment of this application.

FIG. 12 is a schematic diagram of an apparatus according to an embodiment of this application. The apparatus may be the radar in the foregoing embodiments. The apparatus 900 includes a processor 902, a transceiver 903, and a memory 901. Optionally, the apparatus 900 may further include a bus 904. The transceiver 903, the processor 902, and the memory 901 may be connected to each other through the communications line 904. The communications line 904 may be a peripheral component interconnect (peripheral component interconnect, PCI for short) bus, an extended industry standard architecture (extended industry standard architecture, EISA for short) bus, or the like. The communications line 904 may be classified into an address bus, a data bus, a control bus, and the like. For ease of representation, only one thick line is used to represent the bus in FIG. 12, but this does not mean that there is only one bus or only one type of bus.

The processor 902 may be the control module 101 shown in FIG. 1, a CPU, a microprocessor, an ASIC, or one or more integrated circuits configured to control program execution in the solutions of this application.

The transceiver 903 may include an emitter and a detector. The emitter may be used as the laser module 102 shown in FIG. 1 and configured to emit a detection signal. The detector may be used as the detector module 103 shown in FIG. 1 and configured to detect an echo signal.

The memory 901 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, or an optical disc storage (including a compressed optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor through the communications line 904. The memory may alternatively be integrated with the processor.

The memory 901 is configured to store computer-executable instructions for executing the solutions in this application, and the processor 902 controls the execution of the computer-executable instructions. The processor 902 is configured to execute the computer-executable instructions stored in the memory 901, to implement the radar power control method according to the foregoing embodiments of this application.

Figure 13:
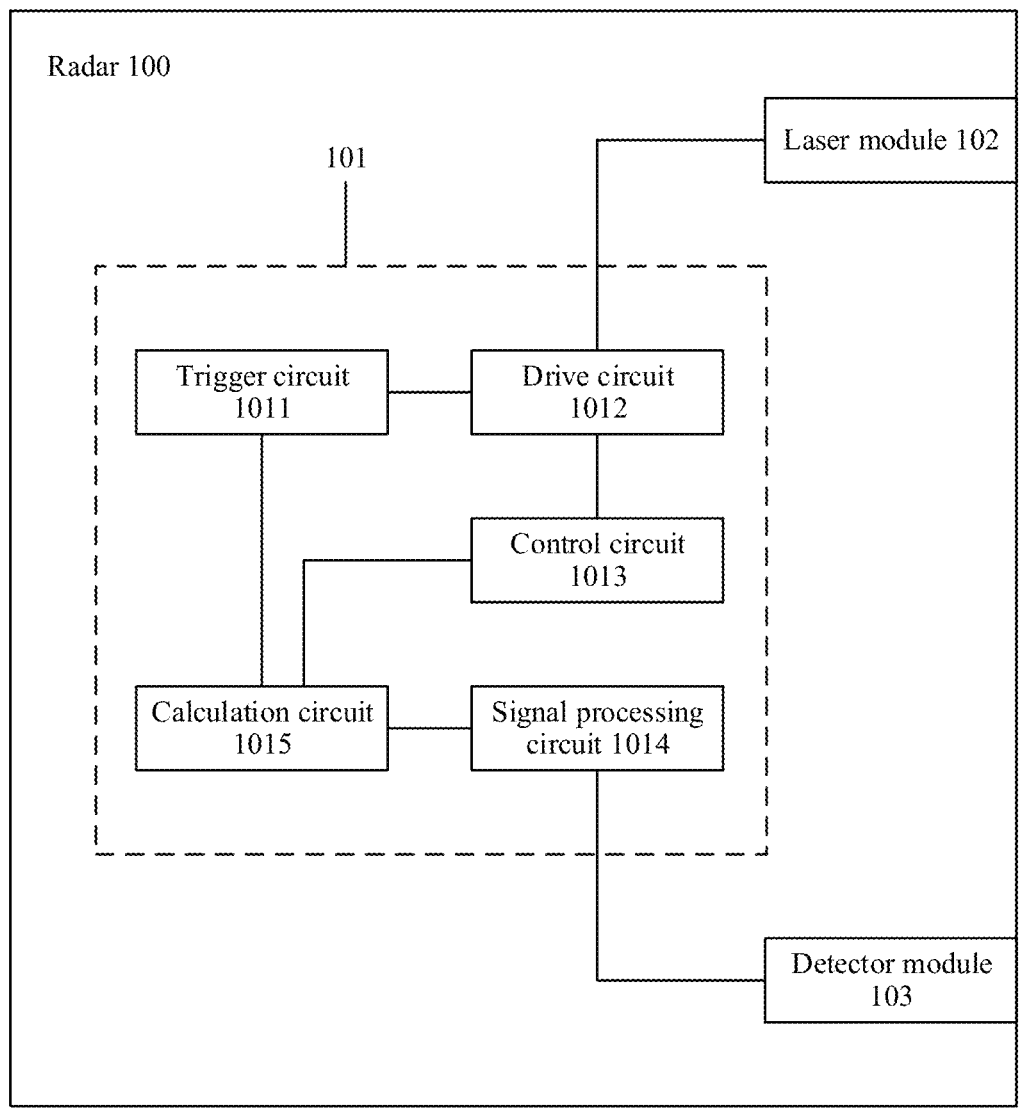
FIG. 13 is a schematic diagram of an apparatus according to an embodiment of this application.

In a possible implementation, as shown in FIG. 13, the processor 902 (the control module 101) may specifically include the following structures: a trigger circuit 1011, a drive circuit 1012, a control circuit 1013, a signal processing circuit 1014, and a calculation circuit 1015.

The trigger circuit 1011 is configured to generate a trigger (trigger) signal, and provide the trigger signal to the drive circuit 1012 and the calculation circuit 1015.

The signal processing circuit 1014 is configured to: receive an echo signal of a first detection signal detected by the detector module 103, perform preprocessing on the echo signal, for example, perform processing such as analog-to-digital conversion, filtering, and amplification on the echo signal, and supply a processed echo signal to the calculation circuit 1015.

The calculation circuit 1015 is configured to: calculate a distance, a reflectivity, and the like of a first detection point based on the trigger signal provided by the trigger circuit 1011 and the processed echo signal provided by the signal processing circuit 1014; and provide a calculation result to the control circuit 1013.

The control circuit 1013 is configured to: determine, based on the calculation result of the calculation circuit 1015, whether to increase emission power corresponding to a target emission angle, adjust a control signal based on the determining result, and provide an adjusted control signal to the drive circuit 1012. For a specific implementation, refer to the foregoing method embodiments. Details are not described in this application.

The drive circuit 1012 is configured to: generate a drive signal based on the trigger signal provided by the trigger circuit 1011 and the control signal provided by the control circuit 1013, and provide the drive signal to the laser module 102, so that the laser module 102 can adjust, based on the drive signal, emission power of each emission angle in a next scanning process. The trigger signal is used to determine a waveform of the drive signal, and the control signal is used to determine strength of the drive signal. Stronger strength of the drive signal indicates higher emission power of the laser module 102. Therefore, the control circuit 1013 may control to reduce the emission power of the laser module 102 by changing the control signal.

Optionally, the computer-executable instructions in the embodiments of this application may also be referred to as application program code. This is not specifically limited in the embodiments of this application.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A radar power control method, comprising:
   emitting a first detection signal at a target emission angle;
   determining whether a signal power of an echo signal of the first detection signal is less than a preset power threshold;
   obtaining scanning information in response to the signal power of the echo signal of the first detection signal not being less than the preset power threshold;
   obtaining a reflectivity of a first detection point of the first detection signal in response to the signal power of the echo signal of the first detection signal being less than the preset power threshold;
   determining whether the reflectivity of the first detection point is greater than a present first threshold;
   maintaining emission power corresponding to the target emission angle in response to the reflectivity of the first detection point not being greater than the preset first threshold; and
   increasing the emission power corresponding to the target emission angle in response to the reflectivity of the first detection point being greater than the preset first threshold.

2. The method according to claim 1, wherein before the obtaining the reflectivity of the first detection point of the first detection signal, the method further comprises:
   detecting an echo-free region using a scan image, wherein the scan image is obtained based on echo signals of detection signals emitted at a plurality of emission angles, and the echo-free region is a region corresponding to a plurality of spatially continuous echo signals whose signal power is less than the power threshold and whose quantity is greater than a preset quantity; and
   determining whether an area of a target echo-free region comprising the first detection point is not greater than a second threshold or a solid angle corresponding to the target echo-free region is not greater than a third threshold.

3. The method according to claim 2, wherein after the obtaining an echo-free region in the scan image, the method further comprises:
   keeping the emission power corresponding to the target emission angle unchanged, in response to the area of the target echo-free region being greater than the second threshold, and the solid angle corresponding to the target echo-free region is greater than the third threshold.

4. The method according to claim 1, wherein the method further comprises:
obtaining a preset angle range; and
determining whether the target emission angle does not fall within the preset angle range.

5. The method according to claim 1, wherein the method further comprises:
determining whether a preset feature object does not comprise a detected object, and the first detection point is on a surface of the detected object.

6. The method according to claim 1, wherein after the increasing emission power corresponding to the target emission angle, the method further comprises:
emitting a second detection signal at the target emission angle based on increased emission power;
obtaining a distance between a second detection point of the second detection signal and a radar based on an echo signal corresponding to the second detection signal; and
reducing the increased emission power of the second detection signal corresponding to the target emission angle in response to the distance between the second detection point and the radar being greater than a fifth threshold or keeping the emission power corresponding to the target emission angle unchanged in response to the distance between the second detection point and the radar being not greater than the fifth threshold.

7. The method according to claim 6, wherein after the emitting the second detection signal at the target emission angle, the method further comprises:
reducing the increased emission power of the second detection signal corresponding to the target emission angle in response to a quantity of times that the echo signal corresponding to the second detection signal being continuously not received reaches a sixth threshold.

8. The method according to claim 1, wherein the obtaining the reflectivity of the first detection point of the first detection signal comprises:
obtaining the reflectivity of the first detection point based on the signal power of the echo signal of the first detection signal or obtaining the reflectivity of the first detection point by an optical image of the first detection point.

9. The method according to claim 1, wherein the method further comprises:
determining whether a moving speed of the radar is greater than a preset seventh threshold.

10. An apparatus, comprising:
one or more processors, and
a non-transitory storage medium in communication with the one or more processors, the non-transitory storage medium configured to store program instructions, wherein, when executed by the one or more processors, the instructions cause the processor to perform:
emitting a first detection signal at a target emission angle;
determining whether a signal power of an echo signal of the first detection signal is less than a preset power threshold;
obtaining scanning information in response to the signal power of the echo signal of the first detection signal not being less than the preset power threshold;
obtaining a reflectivity of a first detection point of the first detection signal in response to the signal power of the echo signal of the first detection signal being less than the preset power threshold;
determining whether the reflectivity of the first detection point is greater than a preset first threshold;
maintaining emission power corresponding to the target emission angle in response to the reflectivity of the first detection point not being greater than the preset first threshold; and
increasing the emission power corresponding to the target emission angle in response to the reflectivity of the first detection point being greater than the preset first threshold.

11. The apparatus according to claim 10, wherein the instructions further cause the processor to perform:
detecting an echo-free region a scan image, wherein the scan image is obtained based on echo signals of detection signals emitted at a plurality of emission angles, and the echo-free region is a region corresponding to a plurality of spatially continuous echo signals whose signal power is less than the power threshold and whose quantity is greater than a preset quantity; and
determining whether an area of a target echo-free region comprising the first detection point is not greater than a second threshold or a solid angle corresponding to the target echo-free region is not greater than a third threshold.

12. The apparatus according to claim 11, wherein after obtaining the echo-free region in the scan image, the instructions further cause the processor to perform:
keeping the emission power corresponding to the target emission angle unchanged, in response to the area of the target echo-free region being greater than the second threshold, and the solid angle corresponding to the target echo-free region is greater than the third threshold.

13. The apparatus according to claim 10, wherein the instructions further cause the processor to perform:
determining whether the target emission angle does not fall within a preset angle range.

14. The apparatus according to claim 10, wherein the instructions further cause the processor to perform:
determining whether a preset feature object does not comprise the detected object.

15. The apparatus according to claim 10, wherein the instructions further cause the processor to perform:
obtaining the reflectivity of the first detection point based on the signal power of the echo signal of the first detection signal or obtaining the reflectivity of the first detection point by an optical image of the first detection point.

16. The apparatus according to claim 10 wherein the instructions further cause the processor to perform:
determining whether a moving speed of the radar is greater than a preset seventh threshold.

17. The apparatus according to claim 10, further comprising a Lidar or a vehicle-mounted radar .

18. An apparatus, comprising:
at least one laser, at least one detector, and a processing circuit;
wherein the at least one laser is configured to emit a first detection signal at a target emission angle;
wherein the at least one detector is configured to detect an echo signal of the first detection signal; and
wherein the processing circuit is configured to determine whether a signal power of the echo signal of the first detection signal is less than a preset power threshold; obtain scanning information in response to the signal power of the echo signal of the first detection signal not being less than the preset power threshold; obtain a reflectivity of a first detection point of the first detection signal in response to a signal power of the echo signal of the first detection signal being less than the preset power threshold; determine whether the reflectivity of the first detection point is greater than a preset first threshold; maintain emission power corresponding to the target emission angle in response to the reflectivity of the first detection point not being greater than the preset first threshold; and increase emission power corresponding to the target emission angle in response to the reflectivity of the first detection point being greater than the preset first threshold.

19. The apparatus according to claim 18, wherein the target emission angle does not fall within a preset angle range.

* * * * *